United States Patent
Lee et al.

(10) Patent No.: US 8,725,138 B2
(45) Date of Patent: May 13, 2014

(54) METHODS FOR NETWORK SELECTION AND DISCOVERY OF SERVICE INFORMATION IN PUBLIC WIRELESS HOTSPOTS

(75) Inventors: Yui-Wah Lee, Eatontown, NJ (US); Scott C. Miller, Freehold, NJ (US)

(73) Assignee: Alcatel Lucent, Paris (FR)

( * ) Notice: Subject to any disclaimer, the term of this patent is extended or adjusted under 35 U.S.C. 154(b) by 2226 days.

(21) Appl. No.: 11/093,782

(22) Filed: Mar. 30, 2005

(65) Prior Publication Data
US 2006/0223527 A1 Oct. 5, 2006

(51) Int. Cl.
H04W 48/16 (2009.01)
H04W 48/18 (2009.01)
H04W 48/08 (2009.01)
H04W 8/18 (2009.01)

(52) U.S. Cl.
CPC .............. *H04W 48/16* (2013.01); *H04W 48/18* (2013.01); *H04W 48/08* (2013.01); *H04W 8/183* (2013.01)
USPC ..................................... 455/432.2; 455/432.1

(58) Field of Classification Search
USPC ......... 455/552.1, 426.1, 432.1–433; 370/328, 370/401
See application file for complete search history.

(56) References Cited

U.S. PATENT DOCUMENTS

| | | | |
|---|---|---|---|
| 5,625,351 A * | 4/1997 | Willard et al. | 340/825.52 |
| 7,146,130 B2 * | 12/2006 | Hsu et al. | 455/3.04 |
| 2002/0022483 A1 * | 2/2002 | Thompson et al. | 455/439 |
| 2002/0160763 A1 * | 10/2002 | Mittal et al. | 455/418 |
| 2004/0063426 A1 * | 4/2004 | Hunkeler | 455/426.1 |
| 2004/0066756 A1 * | 4/2004 | Ahmavaara et al. | 370/328 |
| 2004/0110503 A1 * | 6/2004 | Park | 455/435.1 |
| 2004/0236849 A1 * | 11/2004 | Cooper et al. | 709/224 |
| 2005/0025164 A1 * | 2/2005 | Kavanagh et al. | 370/401 |
| 2005/0143094 A1 * | 6/2005 | Reed et al. | 455/456.2 |

OTHER PUBLICATIONS

3GPP2, "Over-the-Air Service Provisioning of Mobile Stations in Spread Spectrum Standards", Oct. 25, 2002, 3GPP2 C.S0016-b, Version 1.0.*

* cited by examiner

*Primary Examiner* — Allahyar Kasraian
(74) *Attorney, Agent, or Firm* — Wall & Tong, LLP (57) ABSTRACT

A roaming information code which can be wirelessly or otherwise transmitted as a SSID or other data field(s) of a wireless technology or standard. Further, a RIC-VAP scheme for provider-specific security information. Still further, wirelessly or otherwise transmitted compact price and AP workload information codes.

30 Claims, 6 Drawing Sheets

EACH WISP CHOOSES ITS OWN SSID
MT CARRIES WITH IT A ROAMING TABLE

METHODS FOR NETWORK SELECTION AND DISCOVERY OF SERVICE INFORMATION IN PUBLIC WIRELESS HOTSPOTS

FIELD OF INVENTION

The invention relates to wireless networking. More particularly, the invention relates to methods of discovering service information useable for selecting a wireless network service provider offered at a public wireless hotspot.

BACKGROUND OF THE INVENTION

A "wireless hotspot" is commonly known in the art as a geographic location, such as a coffee shop, cafe, airport lounge, hotel lobby or other populated location, where a public wireless network service is provided to "roaming" users of wireless mobile terminals (MTs) through a wireless network, to gain access to the Internet or other networks. The wireless network service is provided by a wireless access point (AP) that serves as an entry point through which the user's MT can get access to the Internet. "Getting access" here means the user can set up data connections to his communication peers on the Internet, and the user's MT can send or receive data packets to or from these peers. It also means that the user can enjoy various Internet applications such as email, messaging, web browsing, multimedia, voice, audio, image, video, file transfer, download, upload, or sharing enabled by these data connections and their data flows.

In such a public wireless hotspot, a roaming user with a MT may be within wireless range of multiple APs. Before the MT can select the AP most appropriate for the user, the MT should discover and consider one or more types of service information. The most critical type of service information is roaming information, i.e., information about whether the AP has a roaming agreement with a network service provider of the user. Other information types that may be useful for the MT to discover and consider include, without limitation, security policies, price, and AP workload.

In view of the foregoing, a method for discovering service information is critically needed. The method should be scalable and backward compatible, it should not require technology changes, it should not require association before discovery of the information, and it should not hinder fast handoff.

SUMMARY OF THE INVENTION

Methods, systems and codes are disclosed for discovering service information. An embodiment of the method comprises coding roaming service information to form a roaming information code; and wirelessly transmitting the roaming information code from a network access point (AP) to a mobile terminal (MT) of a user.

An embodiment of the system comprises a mobile terminal (MT); and a network access point (AP) wirelessly transmitting a roaming information code (RIC) containing roaming service information; wherein the MT receives the RIC from the AP and uses the roaming service information contained in the RIC for determining whether to select the AP.

An embodiment of the code comprises a code for coding roaming service information which enables the MT to determine whether to select the AP.

DETAILED DESCRIPTION OF THE INVENTION

Figure 1:
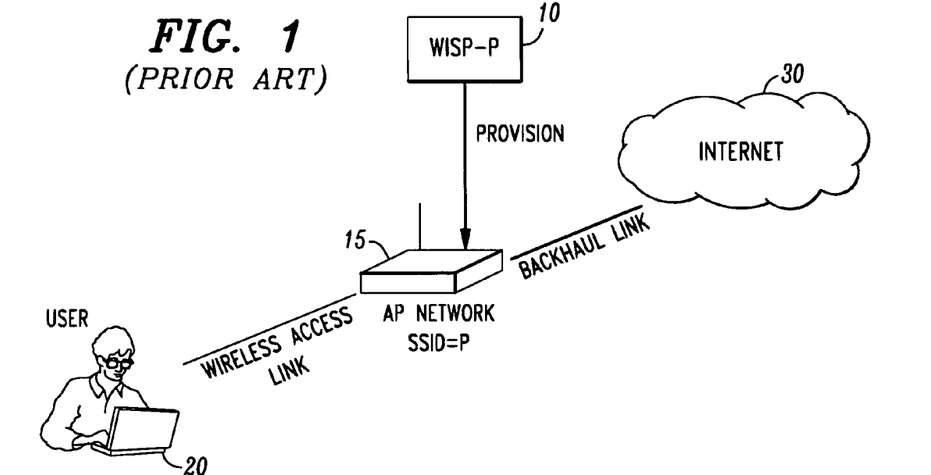
FIG. 1 is a schematic illustration depicting how wireless network services are presently rendered in a public wireless hotspot using existing methods.

Currently, roaming information is typically provided on MTs as static roaming tables. FIG. 1 shows an example of how wireless network service is typically rendered in public wireless hotspots for an MT 20 to gain access to the Internet 30 or other networks. A wireless Internet service provider (WISP) 10 sets up a network of wireless APs 15, with backhaul links into the Internet 30, in various public locations, such as coffee shops, airport lounges, hotel lobbies, etc. The users, who have already subscribed to the WISP 10 for wireless Internet service, carry some type of wireless-enabled MT 20, including without limitation laptop computers, personal digital assistants (PDAs), smartphones, etc. In order for such a user's MT 20 to obtain access to the Internet 30 or other networks in the public wireless hotspot, the user's MT 20 has to be wirelessly connected to the AP 15 of the WISP 10.

The user's MT 20 wirelessly connects to the AP 15 of the WISP 10 by discovering the AP network, based on its name. In accordance with IEEE 802.11 standard, the name of the AP network is provided as a string called a Service Set Identity (SSID), also commonly known as the "network name." (The name of the AP network is not called "AP name" because multiple APs on the same AP network may use the same SSID.) The procedures to use an AP network are as follows: The APs 15 are configured with the same network name. The APs 15 of the network periodically broadcast a beacon, which contains various information including the network name. The MT 20 is configured with the earlier mentioned table of AP network names that are associated with the user's WISP 10. These network names are typically obtained by the user from their WISP 10. The roaming table tells the MT 20 which APs 15 will offer Internet-access service to the user. The MT 20 constantly listens to beacons broadcast by APs 15 and determines if the network name contained in these beacons matches one of the names in its roaming table. If so, it will elect to use the AP network by performing a link-level "association" procedure with the AP 15. (In addition to association, a user authentication procedure will also be typically performed immediately before or after the association procedure.) After a successful association between the MT 20 and the AP 15 (and potentially also after a successful user authentication), the user can access the Internet 30 through the AP network.

Figure 2:
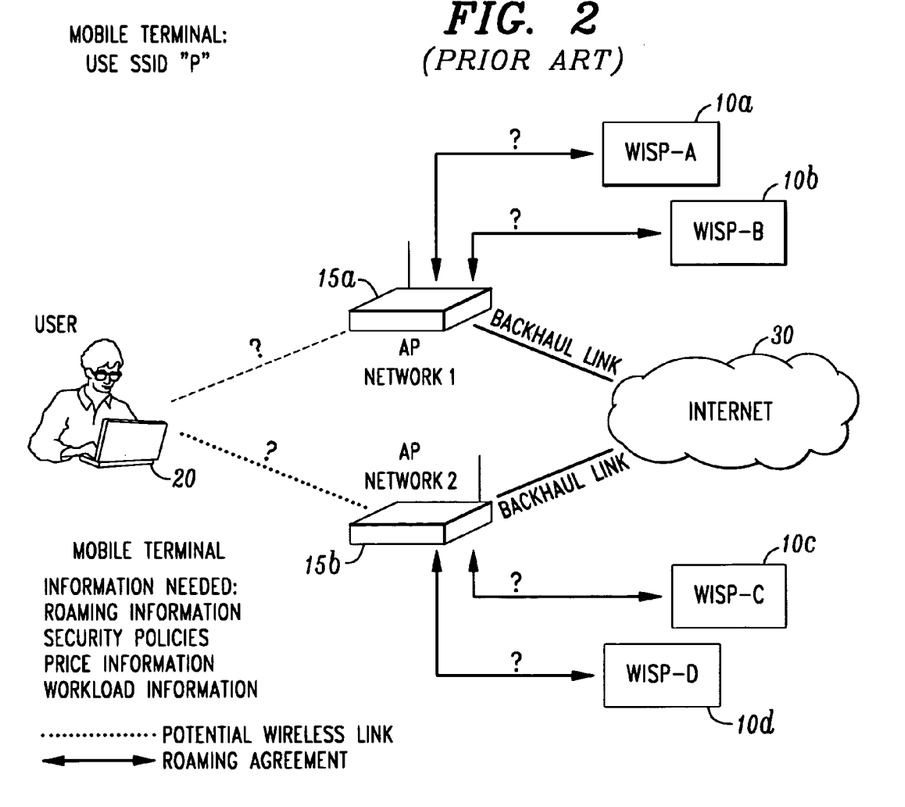
FIG. 2 is a schematic illustration depicting anticipated requirements for rendering wireless network services in a public wireless hotspot in the future.

Although roaming tables presently work well for discovering a wireless AP network, as the market of public wireless Internet service continues to evolve, it is envisioned that there will be several trends that render the roaming tables insufficient or inefficient for the future. FIG. 2 depicts what is the more likely the scenario in the future. First, as depicted in FIG. 2, the AP network may not be owned by a WISP. Instead, it may be owned by an independent operator who arranges to have some type of "roaming agreements" with a plurality of WISPs. The roaming agreement essentially says that the AP network agrees to offer Internet or other network access service to a WISP's subscribers under certain commercial revenue exchange or sharing scheme between the AP network and the WISP. Second, to maximize the return on investment in providing the AP network and the wireless infrastructure, the AP network may have roaming agreements with multiple WISPs 10a-d. Because of these two reasons, the WISP can no longer dictate how the unique network name should be chosen for a given AP, unless the AP has an ability to broadcast multiple network names. This "multiple network name" ability is not yet an industry standard but there is currently an effort to standardize it. However, it has serious drawbacks as we will be explained further on.

Furthermore, the MT 20 may simultaneously discover multiple AP networks 15a and 15b in a given location, anyone of them potentially being capable of offering an Internet access service. Accordingly, the MT 20 has to "select" an AP network (and hence its wireless network) from a group of candidate AP networks 15a and 15b. To select the appropriate AP network, the MT 20 should discover and consider the types of service information discussed earlier.

The issues of network selection and discovery of service information are common across different types of wireless technologies, including without limitation the wireless technology defined in the family of IEEE 802.11 standards, HIPERLAN, HIPERLAN/2, and the like.

In the 802.11 standard, there are three types of frames: data, control, and management. Management frames are Beacons, Probe Request, Probe Response, Association Request, Association Response, Dis-Association, etc. Information is carried in these frames as headers, Fixed Fields (FFs) (fixed-length mandatory frame-body components), and Information Elements (IEs) (variable length mandatory and optional frame-body components).

The SSID discussed earlier is an important IE carried in management frames. Its payload can have zero to 32 octets, and it is a configurable string identifying the AP and its network. Usually, an AP will periodically broadcast its SSID in beacons, for example, every 60 ms. However, an MT can also send a Probe Request with an embedded SSID IE to invite an response from an AP. In this case, an AP configured with the same SSID will reply with a Probe Response that contains not only the SSID but also other useful FFs or IEs, such as beacon interval, capability information, and supported rates. The SSID is also sent in all Association Requests.

The 802.11 standard does not specify how many SSIDs can be put into a beacon, nor does it specify whether a given AP can broadcast different SSIDs in different beacons. The common practice has been that each AP has just a single SSID. However, this has changed recently, and there are AP products that can be configured with and broadcast multiple SSIDs. Unfortunately, without a standard these products from different vendors may not be inter-operable with each other.

The SSID should not be confused with another important ID in the 802.11 standard: Basic Service Set Identity (BSSID). The BSSID is a 48-bit (6-octet) field that uses the same format as an IEEE 802 MAC address. In the infrastructure mode, the BSSID is the MAC address of the AP. The BSSID is sent in all data, control, and management frames.

Another important aspect of wireless technology is security. The original security scheme in the 802.11 standard is called Wired Equivalent Privacy (WEP). This scheme, however, has proven to be cryptographically weak, so there has been an effort to define a new and more secure scheme—the IEEE 802.11i standard. Unfortunately, the standardization process has been very lengthy. As an interim measure, the industry consortium Wi-Fi Alliance decided to endorse a subset of the 802.11i standard and to promote the use of this subset in the industry. The result was the security specification called Wi-Fi Protected Access (WPA).

In addition to the above-mentioned link-layer security schemes, another security scheme has also been commonly adopted in the public wireless hotspot industry. This scheme is called the Universal Access Method (UAM). This scheme may be the most commonly used security scheme in the industry. In this scheme, the AP is set to operate as an open system, i.e., with no link-layer authentication and encryption. An MT can freely associate with an AP, and the WISP asserts control on the internet protocol (IP) level. Typically when the user first accesses a web page, the user's HTTP request will be redirected to a web server, through which the user can perform an web-based authentication procedure. Only after a successful authentication can the user access the Internet—before that all the user's packets to and from the Internet will be dropped. Although by running as an open system, the AP does not offer link-layer data encryption, a user may still protect its privacy by running encryption on the IP level using technologies, such as Internet Protocol Security Protocol (IPSec).

The AP announces the security scheme it desires using an IE called capability information, which is sent in beacons and probe responses. In this IE there is a privacy field (bit 4). The AP sets the field to 1 if it requires the MT to use WEP and sets the field to 0 if it does not. If the AP requires the MT to use WPA or 802.11i, it will use a new IE called a robust security network (RSN) to announce the desired authentication and cipher suites.

As for the logistics of supporting roaming (or the lack thereof), in some cases, a WISP will tell its users to configure only its own network name into their MTs. Hence, these users will get service from only the hotspots of the WISP, i.e., no roaming. In other cases, some WISPs will provide a table of network names to its users.

Wireless technologies has some limited radio ranges, so by nature a wireless hotspot can cover only a limited geographical area. To offer a large coverage, a WISP needs to provide service in many hotspots. It can achieve this either by building as many as possible of its own wireless hotspots, or it can achieve this by allying with other WISPs. By signing roaming agreements with other WISPs, the subscribers of the WISP can obtain services when they roam into the wireless hotspots of these other WISPs. It is generally agreed that roaming support is very critical to the widespread acceptance of the public wireless hotspot services.

The roaming agreements among WISPs may be bilateral or multilateral. In a bilateral roaming agreement, a WISP may sign up pairwise network-sharing roaming agreements with other WISPs individually. In multilateral roaming agreement, a WISP joins a roaming organization, through which it has one-to-multiple roaming agreements with the other WISPs of the organization.

Figure 3:
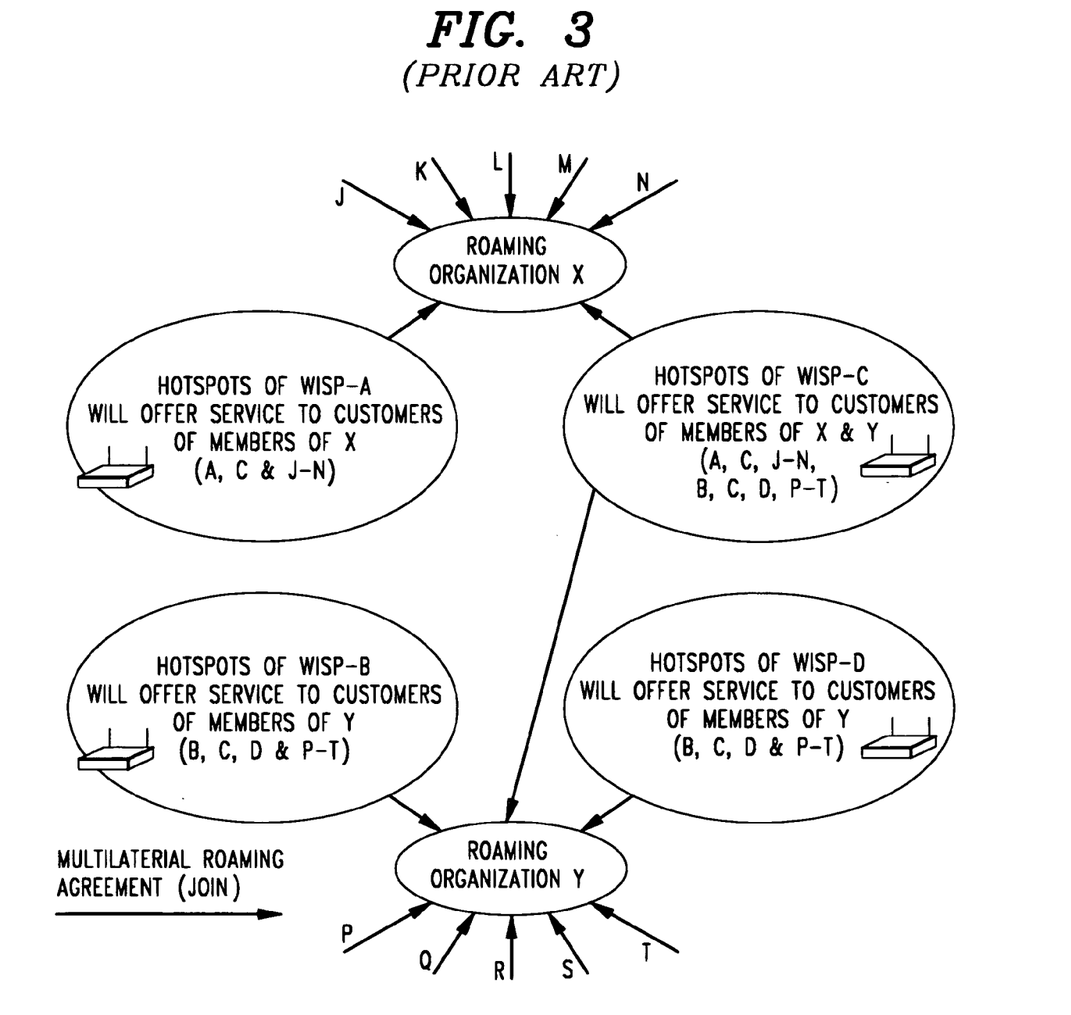
FIG. 3 is a schematic illustration depicting how WISPs may form multilateral roaming agreements in the future.

The multilateral approach scales better with respect to the number of WISPs. As illustrated in FIG. 3, for N WISPs to have full roaming relationships with each other, in the bilateral roaming agreement model, $N(N-1)/2$ bilateral agreements will be needed; whereas in the multilateral roaming agreement model, only N multilateral roaming agreements will be needed. The multilateral roaming agreement model facilitates not only the forming of roaming relationships but also the accounting, billing, and marketing of the services.

In either model, when a user roams to a hotspot, the user's MT has to have some information about the roaming agreements and/or other service information to make an informed decision on network selection. The method used for discovering information should be scalable, backward compatible, not require technology changes, not require association before discovery of the information, and not hinder fast handoff. The method should be scalable because, potentially, there may be millions of hotspots globally, therefore, the method should be capable of performing well at this scale. The method should be backward compatible so that WISPs and AP operators do not have to upgrade the hardware or firmware of their existing equipment. Ideally, the method should not require technology changes because technology changes typically have to go through a lengthy process of technology standardization. The method should not require association before discovery of the roaming information, because association before discovery undesirably prevents the MT from discovering the information by simply listening to the broadcast beacons or by using the efficient probe-request/response mechanisms. Furthermore, if the MT is currently associated with another AP, then the MT has to first disassociate with the current AP before it can acquire information about a candidate AP. This will hinder the implementation of fast handoff. The method should not hinder fast handoff because, when supporting multimedia applications, such as voice over internet protocol (VoIP) or streaming audio/video, an MT has to complete an inter-AP handoff with a very small latency, e.g., less than 50 ms. If handoff is hindered by the method, the users' delay-sensitive multimedia streams will be disrupted.

Figure 4:
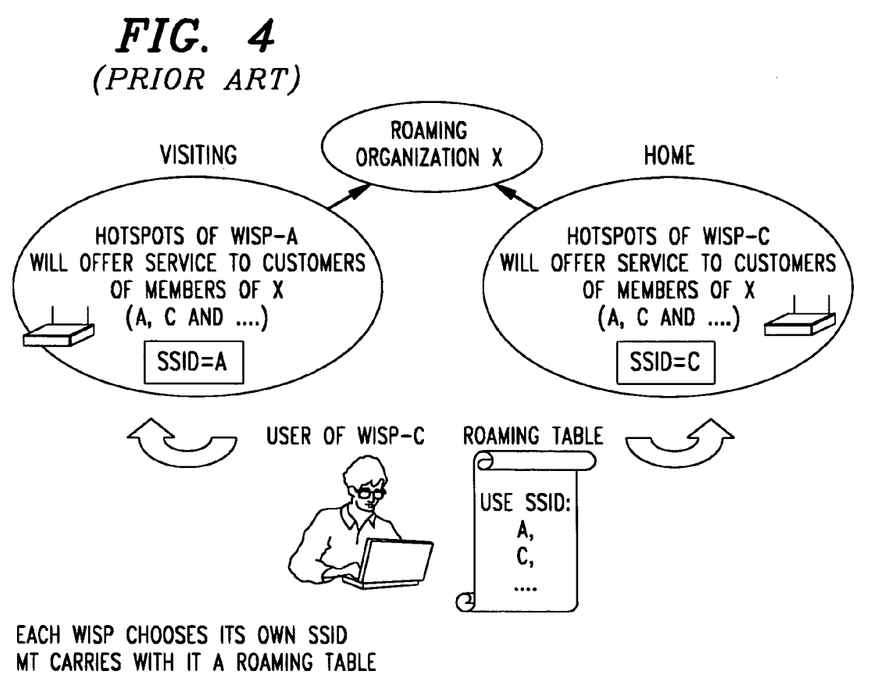
FIG. 4 is a schematic illustration depicting how prior art roaming tables are utilized for discovering service information.

A current method for discovering information, particularly roaming information, is to statically provide the information in a roaming table on the MT, as mentioned earlier. As discussed, each WISP selects a network name (SSID) to identify itself with, and configures its APs to broadcast that network name. In addition, a roaming table is configured on each subscriber's MT, listing all the network names of the WISP's roaming partners. Using the multilateral roaming senarios illustrated in FIG. 3, the users of these WISPs carry roaming tables as illustrated in FIG. 4.

An advantage of the roaming-table method is that it is fully backward compatible with the existing APs. It also does not require an MT to first associate with an AP before discovery of roaming information and there is no obvious hindrance that prevents the implementation of fast handoffs.

A disadvantage of the roaming-table method is that it will not scale well as wireless hotspots increase in number. Currently, common roaming tables have less than a few thousands entries. As wireless hotspots become more popular with time, the number of hotspots, globally, may grow into the range of millions or tens of millions.

A WISP may reduce the size of its roaming table by dividing it into sub-tables according to geography. For example, a WISP may use one sub-table for each metropolitan area, state, or country. The finer the granularity of the geographical region, the smaller the table size. A traveling user visiting a new region, however, will have to pre-download the right table onto the user's MT. The smaller the table, the more inconvenient this pre-download requirement will be, e.g., the users will need to pre-download more frequently or they will have a higher chance of forgetting to pre-download the right tables, etc.

Another disadvantage of the roaming-table method is the substantial management overhead associated with distributing and updating these roaming tables on the users' MTs. In addition, the storage requirement for roaming tables may also be undesirable, especially for handheld devices, such as PDAs or smart phones, where non-volatile memory spaces are more limited.

Figure 5:
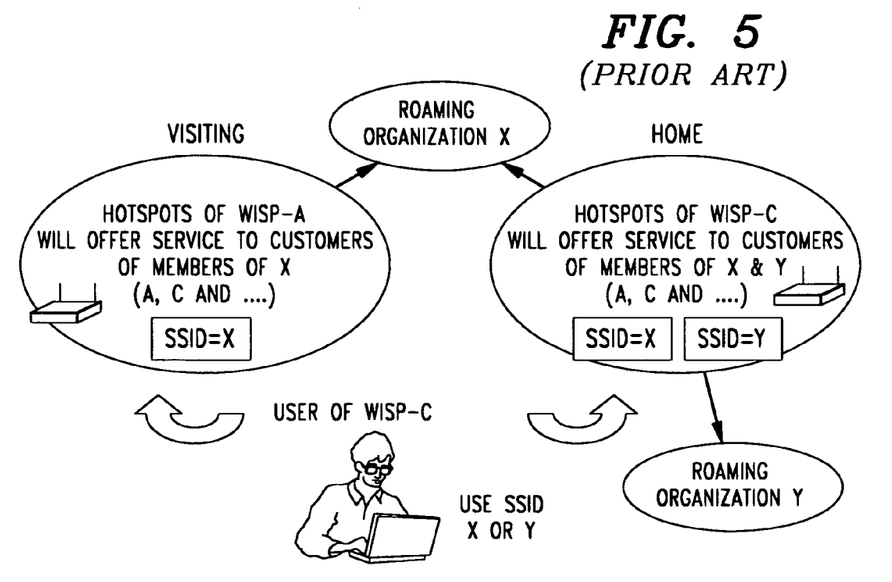
FIG. 5 is a schematic illustration depicting another prior art method for discovering service information wherein WISPs of a roaming organization broadcast the network name of the organization in place of the WISPs' specific network name.

Another current method for discovering service information is illustrated in FIG. 5. In this method, the WISPs of a roaming organization broadcast the network name of the organization instead of broadcasting their WISP specific network name. As illustrated in FIG. 5, WISP B and WISP D are both members of organization Y and configure their APs to broadcast the name "Y". They also configure the MTs of their users to select an AP of the network name "Y". Accordingly, their users do not need to carry around the roaming tables discussed above. Instead, their users only need to configure the SSID "Y" into their MTs in order to obtain services in all hotspots under Organization Y (i.e. any hotspots operated by WISPs B, C, D, P, Q, R, S, T).

Although the method of FIG. 5 works for WISP A, WISP B, and WISP D, it may not work for WISP C, unless the APs of WISP C can announce multiple SSIDs. This is because WISP C has roaming agreements with more than one organization: X and Y.

A method for discovering roaming information should support a WISP like WISP C, as this will benefit both the WISPs and the roaming organizations. The benefit for the WISP is that it can earn more revenues because more users will be able to use its network. The benefit for the roaming organization is that it can reduce the risk of being locked out of a given venue.

The 802.11 standard, however, does not specify a way for a given AP to support the use of multiple SSIDs. Therefore, while there have been some products on the market that support multiple SSIDs, they have not been implemented in the same way. Without a standard, there is no guarantee of interoperability between equipment of different vendors.

To ensure inter-operability, in the IEEE802.11 working group there is a proposal on standardization of the support of multiple SSIDs. The proposal is called a "Virtual AP" scheme, in which multiple "virtual APs" (VAPs) are allowed in a physical AP. Each VAP has its own SSID, BSSID, and capability information, and each VAP broadcasts its own beacon. Since an MT receives these beacons wirelessly, it is not even able to distinguish if these beacons are from one or several physical APs. Since each "virtual AP" has its own BSSID, once the client has decided to use the VAP, it uses the BSSID for all data, control, and management frames communicating with the AP. As a result, both the AP and the client can, at the link level, filter out frames of the BSSIDs that they are not interested in.

The virtual AP proposal retains the important flexibility of allowing an AP operator to join more than one roaming organization. Using the earlier roaming example, this means that WISP C can be members of both organizations X and Y. Its AP will announce this by broadcasting both network names "X" and "Y," as illustrated in FIG. 5.

There are, however, a number of drawbacks associated with virtual-AP scheme. One of these drawbacks is long effective inter-beacon intervals. Since different beacons are broadcast in a round-robin fashion, if the inter-beacon interval is T ms, and N virtual WISPs are supported for a given AP, then the effective inter-beacon interval for a particular VAP will be N×T ms. Practically, it is expected that a given AP cannot host more than 8 or 16 different VAPs.

Another drawback of virtual AP is bandwidth inefficiency. The beacon traffic competes with data traffic on the same air bandwidth. So the more beacons an AP sends out, the less bandwidth will be left for data traffic. For example, if N=3, and N×T is maintained at 60 ms, then T will have to be set at 20 ms. In simulations, it has been shown that when T=20 ms, 20% of an AP's capacity will be used for beacons alone.

Still another drawback of virtual AP is the lack of backward compatibility. Virtual AP is not backward compatible with existing APs because these APs do not currently support the broadcasting of multiple SSIDs. To adopt this scheme, the WISP or AP operator would have to upgrade their the hardware or firmware of their equipment. Most software clients running on the MT also do not understand multiple SSIDs and would, therefore, also need to be upgraded.

The VAP scheme described above may also be embodied in a variation of this basic scheme. In this embodiment, as in the basic scheme, an AP is configured with multiple VAPs, each VAP for a different WISP, and each having its own SSID, BSSID, etc. However, the AP in this embodiment does not broadcast the SSID of these VAPs but, instead, only replies with a probe-response when an MT sends it a probe request embedded with a configured SSID of the VAP.

While this variation of the VAP scheme can avoid the problem of bandwidth inefficiency described above, it has other drawbacks. Broadcasting of SSID can be a crucial means to attract users to use the AP—without it the user may not even be aware that a service is available. As a result, some WISPs may insist to have their SSID broadcast. Furthermore, if SSIDs are not broadcast, the MT will have to constantly, and inefficiently, probing for SSIDs.

Another current method for discovering service information is referred to herein as "overloading EAP-request/ID," wherein "EAP" stands for extensible authentication protocol. An EAP-request/ID is a mandatory message sent from an 802.1x-compliant AP to a Wi-Fi client. Its purpose is to query the identity of the client as a preparation step to complete the EAP-based authentication (RFC3748). The payload in this message is called "type-data," which is used to convey a displayable message for the client. The message can be terminated by a NULL character, but its length is not determined by the NULL character but by the "length" field in the header. The EAP does not specify the use of the octets after the NULL.

Figure 6:
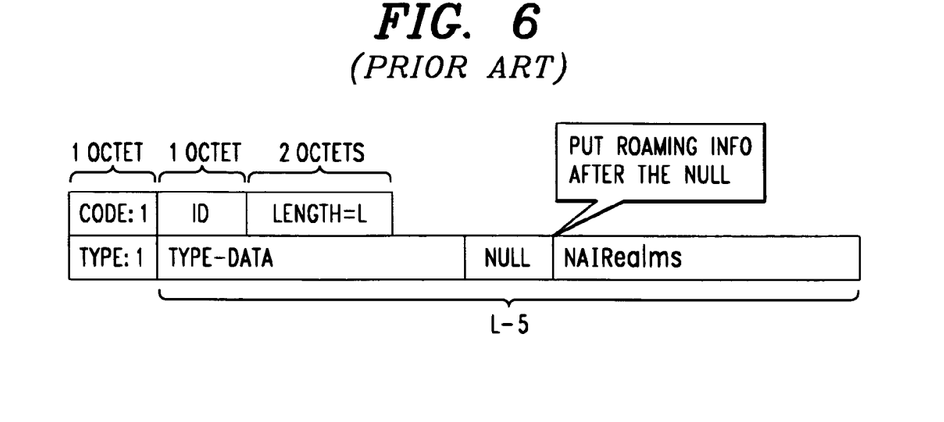
FIG. 6 is a schematic illustration depicting another prior art method for discovering service information referred to herein as "overloading EAP-request/ID."

In accordance with the overloading EAP-request/ID method, roaming information is placed into these octets, as shown in FIG. 6. This method further defines a text-based representation scheme as an attribute called "realms of network access identifier (NAIRealms). In the attribute, the domain names of the WISPs that have roaming agreements with the operator of the AP are listed. Using the example of FIG. 3, the attribute for the hotspot of WISP C would be: NAIRealms=RoamOrg-X.org; RoamOrg-Y.org.

Since EAP messages cannot be fragmented, each message is limited to the size of the network maximum transfer unit (MTU), which can be as small as 1020 octets. As a result, there is an implicit limit on the number of domain names (each of which may take up to a maximum size of 255 octets) that can be listed. The overloading EAP-request/ID method makes use of the 802.1x/EAP mechanism, so it is backward compatible with the existing APs if they support 802.1x (which is a requirement of WPA). However, this method is not backward compatible with earlier non-802.1x APs.

A major disadvantage of the overloading EAP-request/ID method is that the MT has to associate, on the link layer, with the AP first, before EAP messages can be exchanged. That means the MT has to associate with all candidate APs one by one before it can acquire all the roaming information. This problem is especially acute when fast handoff between APs is desired, because the MT has to first give up its association with its current AP before it can discover the roaming information of a candidate AP. This can lead to a large latency for handoffs between APs. Another disadvantage of this solution is that there may be a contention problem. This can happen if the space after the first NULL is already used for some other non-standard purposes.

Another current method for discovering service information is the "brute-force" or "try-and-see" method. In this method, an MT simply tries to associate and then authenticate with all APs in range, one by one and irrespective of their broadcast SSIDs. If it succeeds with one, then the very fact that it can authenticate with the AP confirms that the AP has a roaming agreement with the user's WISP.

An advantage of this approach is that it is very simple, and it is fully compatible with all the existing APs. A major disadvantage of this method, however, is that the MT has to first associate with a candidate AP, and thus disassociate with it current AP, before it can acquire the roaming information from the candidate. Furthermore, each attempt may take a few seconds to complete. This is because it may involve a few round trips of signaling all the way back to the home WISP. The MT cannot hide this latency from the user because it has to disassociate first with the current AP.

Furthermore, a user may have multiple subscriptions with different WISPs, each of which has a different set of credentials (username and password). In this scenario, the brute-force approach has another disadvantage, i.e., the MT does not know how to choose the right set of credentials because it does not know with whom it is trying to authenticate with. The MT can only resort to trying these credentials one by one which further increases the association latency.

Another current method is to manually discover service information. For example, the operator of a hotspot may post a sign, which indicates that the hotspot supports certain WISPs. The sign also instructs the user to manually configure their MT to use a particular SSID.

The advantages of manual discovery are that it is very simple, and it is fully compatible with all the existing APs. The disadvantages are that it requires manual intervention from the users, and it does not provide automatic handoffs between APs of different WISPs.

A first aspect of the present invention comprises a roaming information code (RIC) for containing coded roaming service information. The RIC is wirelessly or otherwise transmitted by an AP to an MT.

The RIC includes a plurality of octets. The RIC is capable of encoding roaming service information. In one embodiment, the plurality of octets includes 32 octets (256 bits), which is capable of containing $2^{256}=1.16\times10^{77}$ different information patterns. By careful selection of the information representation scheme, roaming service information may be encoded into the code.

Figure 7A:
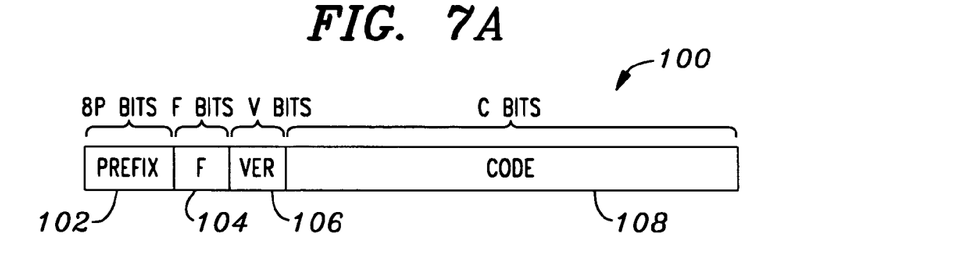
FIG. 7A is a schematic illustration depicting an embodiment of a roaming information code (RIC) in accordance with a first aspect of the invention.

In one embodiment, as shown in FIG. 7A, the RIC 100 may contain four fields: prefix 102, flags 104, version number 106, and code 108, wherein p octets are used for the prefix 102, f bits are used for the flags 104, v bits are used for the version numbers 106, and c bits are used for the code field 108. If the code has, for example, 32 octets, then $8p+f+v+c=32\times8=256$ bits.

The prefix field 102 is used to expand the code of the RIC 100. In other words, each prefix creates a new code (of size $f+v+c$ bits). For example, the prefix "AA" creates a code (of $f+v+c$ bits) that can be used independently with the codes prefixed by "AB", "AC", "AD", etc. The prefix may be assigned geographically or non-geographically. For example, if $p=2$, and only ASCII characters [a-zA-Z0-9] are used (i.e. total of 62 different alphabets), then $62\times62=3844$ different prefixes are possible. In one embodiment, the well known country code—Top Level Domain (ccTLD), which is used in the Internet domain name system for each country, may be used as the prefix, so that "US" is for the USA, "UK" is for Great Britain, etc. The other patterns may be reserved for future uses.

The flags field 104 may be used for control information. In one embodiment, a "check bit" may be used to aid in differentiating a RIC from a legacy SSID. The mechanism works as follows. The most significant bit of an octet is defined to be the check bit. This bit is always set to "1". This assures that the octet in every RIC is always a non-ASCII character. As such, a RIC will not be confused with a legacy SSID, which is traditionally a human-readable string and is unlikely to contain any non-ASCII characters. For example, without the check bit, a legacy SSID "USA11," or in hexadecimal "55 53 41 31 31 00H," can be confused as a RIC with the following interpretation: prefix is "US" (ASCII 55 53H), bits 1 and 7 of flags are set (41H), version number is 49 (31H), and bits 2,3,7 of the bitmap are set (31H). The check-bit mechanism prevents this confusion from happening.

In an alternate embodiment, a bit of the flags field 104 may also be used to differentiate between two forms of code (i.e. code as "bitmap" or code as "concatenated roaming organization number," as will be discussed further on). Unused bits may be reserved for other uses.

The version-number field 106 allows changing of the interpretation of the RIC 100 as time goes by. For example, in Version 0, bit 0 may be assigned to a roaming organization "X", but in Version 1, the same bit 0 may be assigned to a different roaming organization "Y".

Figure 7B:
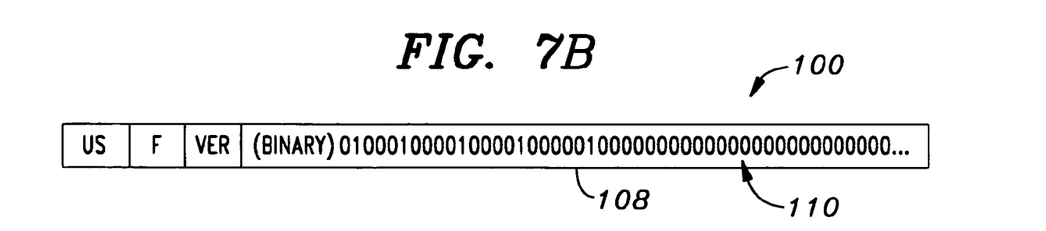
FIG. 7B is a schematic illustration depicting another embodiment of the RIC.

The code field 108 contains the actual coding of roaming or other service information. In one embodiment, as shown in FIG. 7B, the service information may be coded as a bitmap 110 in the code field 108 using bitmap coding. Specifically, each bit in the bitmap 110 is assigned to a roaming organization, such as X and Y (as in FIG. 3). A set bit (bit value equals 1) means "the AP is a member of the roaming organization" and a clear bit (bit value equals 0" means "the AP is not a member of the roaming organization". In this encoding scheme, if $c=224$, for example, then 224 distinct roaming organizations can be represented per prefix.

Figure 7C:
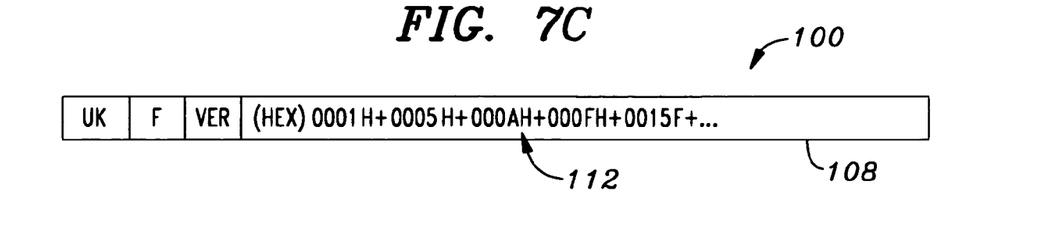
FIG. 7C is a schematic illustration depicting yet another embodiment of the RIC.

In another embodiment, as shown in FIG. 7C, the service information may be coded in the code field 108 as a series of concatenated numbers 112. Specifically, each roaming organization is assigned a roaming organization number (RON) in an a-octet name space. Accordingly, in one embodiment there can be $2^{8a}$ different such roaming organizations for each prefix 102. The RONs 112 may be concatenated to fit into the code field 108. In a given RIC, the RON of an organization is listed if the operator of the AP has a roaming agreement with the organization. If the RON of an organization is not listed, this means the operator of the AP does not have a roaming agreement with the organization. With the concatenation coding, the length of the code field 108 will limit how many RONs can be listed. In other words, at most n roaming organizations can be supported per AP, where $8a\times n \leq c$. Assuming, for illustrative purposes only, that $a=2$ and $c=224$, then under each prefix there can be at most $2^{16}=65536$ different RONs, and there can be at most $224/16=14$ RONs listed in code field 108.

The bits or RONs in the code field 108 may be assigned using a first-come-first-serve basis, an auction method, or any other suitable method. Alternatively, the bits or RONs may be assigned using leasing methods, where each roaming organization is required to pay a "fee" to maintain an assignment for a period of, for example but not limitation, one year. Still further, the bits or RONs may be assigned using any combination of the above methods.

It is expected that only roaming organizations, not individual WISPs, except perhaps only some very large nationwide or global WISPs, will require bit or RON assignments. It is also expected that the number of distinct roaming organizations will be much smaller than that of individual WISPs. In other words, while there may be millions of WISPs globally, only a handful of roaming organizations are likely to exist. Accordingly, the above example limits (224 bits per prefix in the bitmap embodiment and 65,536 RONs per prefix in the concatenated RONs embodiment) will not likely pose any scalability problems or hinder the growth of the industry. Similarly, scalability problems are not expected to be imposed by the example limit that at most 14 RONs can be concatenated in a RIC. This is because a given operator of a hotspot is unlikely to enter into agreements with more than, for example but not limitation, 14 different roaming organizations, because of the burdensome and costly task of having to provide separate setup of billing and accounting channels for each agreement. If, however, the number of roaming organizations is greater than expected and/or if larger than expected numbers of individual WISPs require bit and RON assignments, then the number of octets in the RIC representation may be increased. For example but not limitation, the preferred number of octets may be increased, without limitation, from 32 octets to 64 octets or higher. The increase of size will, however, likely require standardization.

Figure 8A:
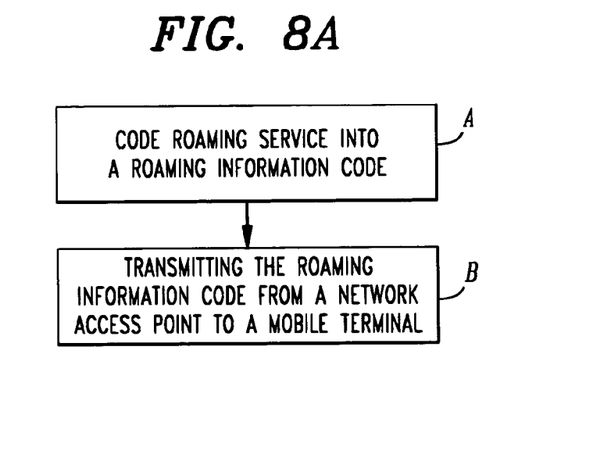
FIG. 8A is a flowchart depicting a method for allowing an MT to discover roaming service information using the RIC.

As depicted in the flow chart of FIG. 8A, roaming service information is coded into an RIC in step A and then the RIC is wirelessly or otherwise transmitted by an AP to an MT of a user in step B, thereby providing a method for allowing the MT to discover roaming service information.

Figure 8B:
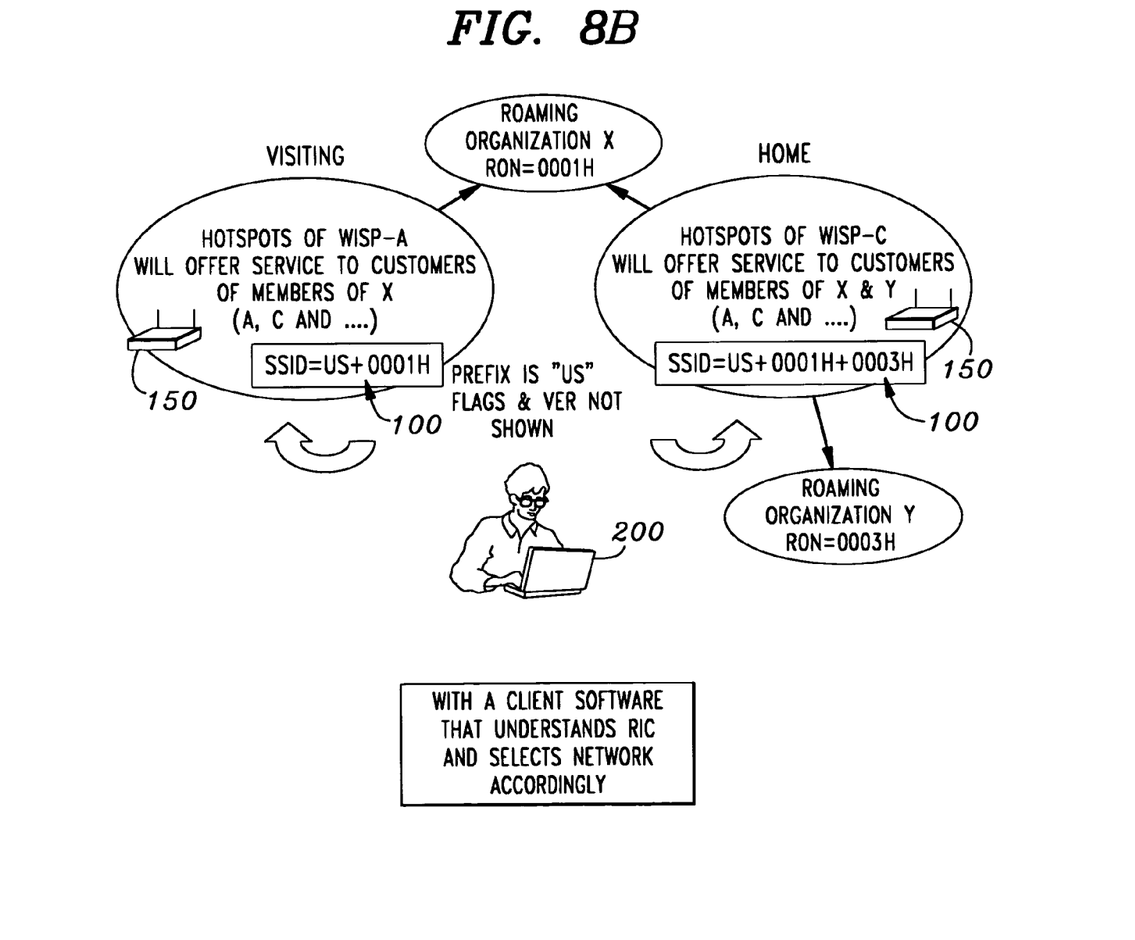
FIG. 8B is a schematic illustration of an embodiment of a system that utilizes the RIC.

In the system embodied in FIG. 8B, the RICs 100 are wirelessly transmitted from APs 150 by overloading the existing SSID Information Element (IE) used in IEEE 802.11 standard. In this embodiment, the SSID IE of the beacons and probe responses transmitted wirelessly by the APs 150 will not be carrying their traditional network names. Instead, they will be carrying RICs 100 of the invention. This method is fully backward compatible with existing APs. In implementing this embodiment of transmission, the operators of the APs will no longer configure their network names into SSID IEs, but will instead configure to put their RICs into the IEs.

In an alternate embodiment, the RIC of the invention may be wirelessly transmitted from an AP to an MT as a new data field different from the SSID IE used in the 802.11 standard.

For example but not limitation, this new data field can be a new Information Element (IE) to be defined by the next version of the IEEE 802.11 standard. This RIC transmission method allows operators to retain their traditional network names and to announce them as conventional SSIDs. Implementation of this RIC transmission method will likely require technology standardization for new IEs and hardware and/or firmware upgrading of the existing APs.

In each of the above RIC transmission embodiments, the user's MT may require a new client software component that recognizes the RIC and makes the network selection decision accordingly.

The RIC of the invention for representing roaming information is very scalable. It does not suffer from the scalability problems associated with roaming tables. Using the example values mentioned earlier, there can be 224 roaming organizations represented per prefix using bitmap coding. If the concatenated coding and RONs are used, 65,536 roaming organizations can be represented per prefix, and each AP can have roaming agreements with as many as 14 different roaming organizations.

In addition, an MT does not have to first associate with an AP before the MT can acquire the roaming information. This is a advantage over other methods such as "overloading EAP-request/ID" and "brute force" methods. As a result, the RIC method of the invention does not hinder the implementation of fast handoffs.

Further, the representation scheme of the RIC is very compact. Using only a small number, for example but not limitation, 32 octets, the RIC can encode a large quantity of information and is far more compact then other text-based schemes, such as the NAIRealms attribute proposed as part of the "overloading EAP-Request/ID" method.

Still further, the RIC method of the invention is very efficient. There is no roaming tables to be carried around by the MTs (as required by current roaming table methods) and there are no additional beacons or additional probe-requests/responses needed (as required in current VAP methods). In addition, no additional level-2 exchanges between the MT and the AP are required as in the "overloading EAP-request/ID" method and there is no need for human intervention as required in the manual methods.

A second aspect of the invention combines the RIC method of discovering roaming information as discussed previously with the VAP (virtual access point) method of discovering security information. In one embodiment, the VAP method may be part of a future IEEE 802.11 standard, but the method can also be embodied into other standards. This aspect of invention, which we call RIC-VAP here, enables a given AP to permit different WISPs to use their own specific security policy, and provides an MT with a method for discovering this information.

As discussed earlier, there are different security schemes under the IEEE 802.11 standard: UAM, WEP, WPA, and 802.11i. It is very likely that these different security schemes will co-exist in the market for a long period of time, and it is likely that different WISPs hosted on a given AP may want to mandate their own security schemes.

Without VAP, all WISPs supported under a given AP may have to use a common security scheme. This is because the traditional AP can only announce one SSID and one capability or RSN IE describing the mandated security scheme. VAP allows partitioning of traffic at the link layer and also allows different WISPs hosted on a given AP to choose their own security schemes. Thus, with VAP, WISPs supported under a given AP can use their own specific security policy.

An embodiment of the RIC-VAP method for discovering roaming information and security policy of the invention will now be described with reference to the following assumptions which are not meant to be limiting and are merely provided as examples to aid in the description of the invention: a single SSID is transmitted per beacon, the AP is VAP supported and can therefore reply with probe response for different VAPs, each with a distinct BSSID and capability or RSN IE and each of the WISPs has a distinct SSID, which is known to the MTs.

Figure 9:
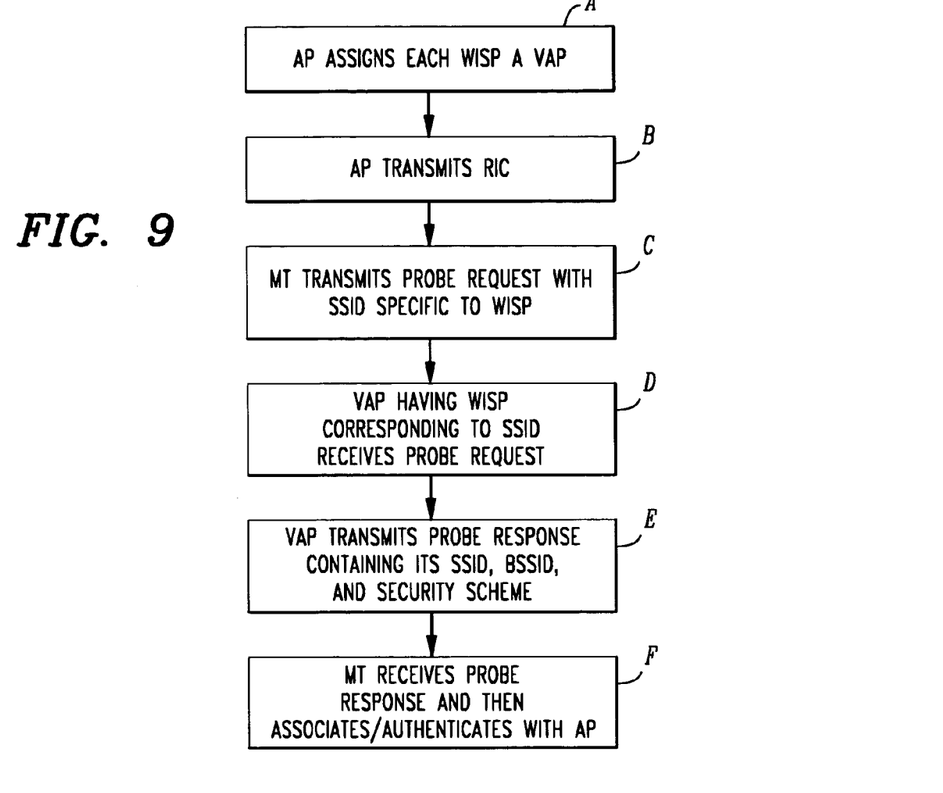
FIG. 9 is a flowchart depicting an embodiment of a RIC-VAP method in accordance with a second aspect of the invention.

In accordance with the RIC-VAP method, as depicted in the flow chart of FIG. 9, the VAP supported AP in step A, may assign each of the WISPs a VAP with its distinct SSID, BSSID, and security scheme (e.g., described in the capability info IE or the RSN IE).

In step B, the AP then broadcasts a single generic beacon containing roaming information in RIC, which can be transmitted as a SSID or as a new IE as described earlier. The AP does not have to broadcast beacons containing this WISP-specific information.

In step C, through the RIC, an MT determines whether the AP supports the roaming organization of the user's WISP. If the answer is positive, then the MT may decide to select the AP network and, in step D, may then send a probe request with a SSID that is specific to the WISP.

In step E, upon receiving the probe request addressed to itself, the VAP on the AP may reply in step F with a probe response containing its own SSID, BSSID, and security scheme described in the capability info or RSN IE.

In step G, upon receiving this probe-response, the MT may proceed to associate/authenticate with the AP, using the acquired BSSID and the suggested security scheme. All subsequent signaling and data traffic between the MT and the AP may use the same BSSID.

As compared to a conventional VAP, the AP in the RIC-VAP method of the invention does not need to broadcast beacons of different VAPs in a cycle, instead the roaming support of a particular WISP is announced through RIC. Therefore, the RIC-VAP method of the invention avoids long inter-beacon intervals and bandwidth loss due to the broadcast of extra beacons.

The RIC-VAP method of the invention enhances the RIC method discussed earlier by adding the ability to allow different WISPs to select their own security schemes. Furthermore, link-layer partitioning of traffic is provided.

A third aspect of the invention comprises a method of dynamically discovering other service information. For example, it may be desirable for an MT to select an AP network based on the current price or based on the workload of the AP. Hence, an MT should be capable of dynamically discovering such information from an AP.

Unlike some current methods, e.g. the CARD protocol, the dynamic discovering method of the invention is performed strictly in the link-layer (layer 2). This has an advantage over these other methods because information such as current price and/or AP workload is needed for a link-layer decision (network selection).

In one embodiment of the third aspect of the invention, the dynamic discovering method of the invention extends the IEEE 802.11 standard and comprises new IEs (Information Elements). In other embodiments, the method can extend other wireless standards. In the former embodiment, as with other existing IEs, the new IEs of the invention will be used in beacons and probe-responses.

The IEs of the present invention can be used with or without the support of VAP. When used with VAP, they allow an individual WISP to announce its own information. For example, each WISP can set its own dynamic price. Even if VAP is not supported, they are useful for enabling the operator of the AP to announce generic but dynamic information, such as surcharge information, to name a non-limiting example.

Figure 10A:
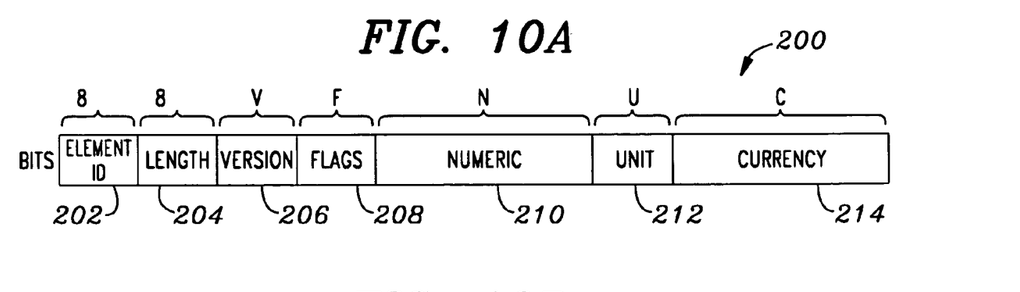
FIG. 10A is a schematic illustration depicting an embodiment of an information element comprising a compact code for price information in accordance with a third aspect of the invention.

Referring to FIG. 10A, an embodiment of the IE of the invention comprises a compact code for price information (CCPI) 200. The CCPI 200 may contain seven fields: elementID 202; length 204; version 206; flags 208; numeric 210; unit 212; and currency 214.

In the embodiment of FIG. 10A, the elementID field 202 forms the first octet, and the length field 204 forms the second octet. The meanings of the elementID field 202 and the length field 204 are defined in the IEEE 802.11 standard. In accordance with the third aspect of the invention, the other fields may be sized as follows: V bits for the version field 206; F bits for the flags field 208; N bits for the numeric field 210; U bits for the unit field 212; and C bits for the currency field 214.

The CCPI embodied in FIG. 10A may have a length of 2+L octets, where L=ceiling(V+F+N+U+C)/8). (The function X=ceiling(x) takes a number x and returns the smallest integer X that is larger than or equal to x. For example, ceiling (2.5) would be 3; ceiling(3) would also be 3.) If, in an illustrative embodiment, V=4, F=4, N=32, U=4, and C=12, then L=7 and the length of the CCPI=9 octets.

In some embodiments the flag field 208 may have a flag that indicates whether the advertised price is a surcharge or a total charge.

In some embodiments the numeric field 210 may use the IEEE single precision floating point number.

In some embodiments the unit field 212 may encode $2^U$ different units. For example, 0 for "per minute", 1 for "per hour", 2 for "per day", etc.

In some embodiments the currency field 214 may encode $2^C$ different currencies. For example, 0 for US Dollar, 1 for British Pound, 2 for Euro, etc.

Figure 10B:
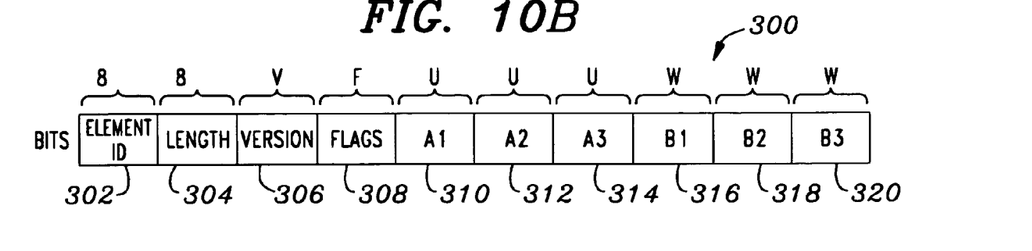
FIG. 10B is a schematic illustration depicting an embodiment of a compact code for AP workload in accordance with the third aspect of the invention.

FIG. 10B, shows another embodiment of the third aspect of the invention that comprises a compact code for AP Workload (CCAPWL) 300. The CCAPWL 300 may be used in an IE of the IEEE 802.11 standard. In other embodiments, the CCAPWL 300 may be used in other wireless standards. The CCAPWL 300 may contain 10 fields: elementID 302; length 304; version 306; flags 308; over-the-air workload parameter-1 310; over-the-air workload parameter-2 312; over-the-air workload parameter-3 314; backhaul workload parameter-1 316; backhaul workload parameter-2 318; and backhaul workload parameter-3 320.

In the embodiment of FIG. 10B, the elementID field 302 forms the first octet, and the length field 304 forms the second octet. The meanings of these fields are defined in the IEEE 802.11 standard. In accordance with the third aspect of the invention, the other fields may be sized as follows: V bits for the version field 306; F bits for the flags field 308; U bits for the over-the-air workload parameter-1 field 310; U bits for the over-the-air workload parameter-2 field 312; U bits for the over-the-air workload parameter-3 field 314; W bits for the backhaul workload parameter-1 field 316; W bits for the backhaul workload parameter-2 field 318; and W bits for the backhaul workload parameter-3 field 320.

The three over-the-air workload fields 310, 312, and 314 enable the AP to announce three running averages, e.g., for the past 1, 5, and 15 minutes. In other embodiments less or more than three over-the-air workload fields may be used for different past time frames.

The three backhaul workload fields 316, 318, and 320 enable the AP to announce three running averages, e.g., for the past 1, 5, and 15 minutes. In other embodiments less or more than three backhaul workload fields may be used for different past time frames.

In the shown embodiment, the CCAPWL 300 may have a length of 2+L octets, where L=ceiling((V+F+3 U+3W)/8), where the meaning of the ceiling function is defined previously (The function X=ceiling(x) takes a number x and returns the smallest integer X that is larger than or equal to x. For example, ceiling(2.5) would be 3; ceiling(3) would also be 3.) If, in an illustrative embodiment, V=4, F=4, U=8, and W=8, then L=7 and the length of the CCPI=9 octets.

Although the invention has been described in terms of various embodiments, it is not limited thereto. For example, for ease in understanding the invention, the same was described with reference to the IEEE 802.11 standards. One of ordinary skill in the art will appreciate, however, that the invention is substantially applicable to all different wireless technologies including, without limitation, wireless local area networking (WLAN), wireless metropolitan area networking (WMAN) and wireless personal area networking (WPAN). Therefore, the appended claims should be construed broadly, to include other variants and embodiments of the invention, which may be made by those skilled in the art without departing from the scope and range of equivalents of the invention.

What is claimed is:

1. A method for discovering service information associated with a wireless access point (WAP), the method comprising:
   coding roaming service information to form a roaming information code, wherein the roaming service information comprises information identifying a plurality of roaming organizations having respective roaming agreements with an owner or operator of the WAP; and
   wirelessly transmitting the roaming information code from the WAP toward a mobile terminal (MT) of a user.

2. The method according to claim 1, wherein a roaming organization is a plurality of wireless network service providers having a joint roaming relationship.

3. The method according to claim 1, wherein a part of the roaming service information is encoded as a bitmap comprising a plurality of bits, each of the bits representing a roaming organization having or not having a roaming agreement with an owner or operator of the WAP.

4. The method according to claim 3, wherein a bit with a value of one (1) indicates the owner or operator of the WAP has a roaming agreement with the roaming organization for which the bit is assigned, and wherein a bit with a value of zero (0) indicates that the owner or operator of the WAP does not have a roaming agreement with the roaming organization for which the bit is assigned.

5. The method according to claim 3, wherein a bit with a value of zero (0) indicates the owner or operator of the WAP has a roaming agreement with the roaming organization for which the bit is assigned, and wherein a bit with a value of one (1) indicates that the owner or operator of the WAP does not have a roaming agreement with the roaming organization for which the bit is assigned.

6. The method according to claim 1, wherein a part of the roaming service information is encoded as a series of concatenated numbers, wherein each number is an identity of a roaming organization.

7. The method according to claim 6, wherein the presence of the number of a roaming organization in the series indicates that the owner or operator of the WAP has a roaming agreement with that roaming organization, and wherein the omission of the number of a roaming organization in the series indicates that the owner or operator of the WAP does not have a roaming agreement with that roaming organization.

8. The method according to claim 1, wherein the roaming information code is formed by a plurality of octets, at least one of the octets being for the coded roaming service information.

9. The method according to claim 8, wherein the plurality of octets define a plurality of bits, at least one of the bits being for a prefix.

10. The method according to claim 9, wherein a subset of the prefixes comprises a country code--top level domain.

11. The method according to claim 8, wherein the plurality of octets define a plurality of bits, at least one of the bits being for control purposes.

12. The method according to claim 11, wherein the at least one bit for control purposes comprises a check bit for distinguishing the roaming information code from a legacy service set identity.

13. The method according to claim 12, wherein the check bit comprises the most significant bit of at least one of the octets, wherein the check bit is set to 1 (one) to ensure that the at least one octet does not form an ASCII character.

14. The method according to claim 11, wherein the at least one bit for control purposes comprises a check bit for distinguishing the roaming information code from a legacy ASCII string.

15. The method according to claim 14, wherein the check bit comprises the most significant bit of at least one of the octets, wherein the check bit is set to 1 (one) to ensure that the at least one octet does not form an ASCII character.

16. The method according to claim 8, wherein the plurality of octets define a plurality of bits, at least one of the bits being for identifying a version of the roaming information code.

17. The method according to claim 1, wherein the wirelessly transmitting step is performed by wirelessly transmitting the roaming information code as a service set identity (SSID).

18. The method according to claim 1, wherein the wirelessly transmitting step is performed by wirelessly transmitting the roaming information code as a data field in a communication packet.

19. The method according to claim 18, wherein the data field comprises an information element.

20. A system comprising:
a mobile terminal (MT); and
a wireless access point (WAP);
wherein the WAP wirelessly transmits a roaming information code (RIC) comprising roaming service information, wherein the roaming service information comprises information identifying a plurality of roaming organizations having respective roaming agreements with an owner or operator of the WAP;
wherein the MT receives the RIC from the WAP and uses the roaming service information contained in the RIC for determining whether to select the WAP.

21. The system according to claim 20, wherein a roaming organization is a plurality of wireless network service providers having a joint roaming relationship.

22. A wireless access point (WAP), the WAP configured to:
code roaming service information to form a roaming information code, wherein the roaming service information comprises information identifying a plurality of roaming organizations having respective roaming agreements with an owner or operator of the WAP; and
wirelessly transmit the roaming information code toward a mobile terminal (MT) of a user.

23. The WAP of claim 22, wherein a roaming organization is a plurality of wireless network service providers having a joint roaming relationship.

24. The WAP claim 22, wherein a part of the roaming service information is encoded as a bitmap comprising a plurality of bits, each of the bits representing a roaming organization having or not having a roaming agreement with an owner or operator of the WAP.

25. The WAP of claim 22, wherein a part of the roaming service information is encoded as a series of concatenated numbers, wherein each number is an identity of a roaming organization, wherein the presence of the number of a roaming organization in the series indicates that the owner or operator of the WAP has a roaming agreement with that roaming organization, and wherein the omission of the number of a roaming organization in the series indicates that the owner or operator of the WAP does not have a roaming agreement with that roaming organization.

26. The WAP of claim 22, wherein the roaming information code is formed by a plurality of octets, at least one of the octets being for the coded roaming service information.

27. The WAP of claim 26, wherein the plurality of octets define a plurality of bits, at least one of the bits being for identifying a version of the roaming information code.

28. The WAP of claim 26, wherein the plurality of octets define a plurality of bits, at least one of the bits being for control purposes, wherein the at least one bit for control purposes comprises a check bit for distinguishing the roaming information code from a legacy service set identity or a check bit for distinguishing the roaming information code from a legacy ASCII string.

29. The WAP of claim 22, wherein the WAP is configured to wirelessly transmit the roaming information code as a service set identity (SSID).

30. The WAP of claim 22, wherein the WAP is configured to wirelessly transmit the roaming information code as a data field in a communication packet.

* * * * *